US010064350B2

(12) United States Patent
Iwai

(10) Patent No.: US 10,064,350 B2
(45) Date of Patent: Sep. 4, 2018

(54) HIGH-SHELF HYDROPONIC CULTIVATION SYSTEM EQUIPPED WITH SOLAR PANEL

(71) Applicant: FARM LAND CO., LTD., Maebashi-shi, Gunma (JP)

(72) Inventor: Masayuki Iwai, Maebashi (JP)

(73) Assignee: FARM LAND CO., LTD., Maebashi-shi (JP)

(*) Notice: Subject to any disclaimer, the term of this patent is extended or adjusted under 35 U.S.C. 154(b) by 156 days.

(21) Appl. No.: 14/909,533

(22) PCT Filed: Feb. 25, 2015

(86) PCT No.: PCT/JP2015/055320
§ 371 (c)(1),
(2) Date: Feb. 2, 2016

(87) PCT Pub. No.: WO2016/002250
PCT Pub. Date: Jan. 7, 2016

(65) Prior Publication Data
US 2016/0165822 A1 Jun. 16, 2016

(30) Foreign Application Priority Data

Jun. 30, 2014 (JP) ................................. 2014-133552

(51) Int. Cl.
*A01G 31/00* (2018.01)
*A01G 31/02* (2006.01)
(Continued)

(52) U.S. Cl.
CPC .............. *A01G 31/02* (2013.01); *A01G 9/243* (2013.01); *H02S 20/23* (2014.12); *Y02B 10/12* (2013.01); *Y02P 60/124* (2015.11); *Y02P 60/216* (2015.11)

(58) Field of Classification Search
CPC .......... A01G 31/02; A01G 7/045; A01G 9/02; A01G 9/243; H02S 20/23; A01M 21/046
See application file for complete search history.

(56) References Cited

U.S. PATENT DOCUMENTS 7,162,833 B2 * 1/2007 Faris ................. A01G 13/0206
47/58.1 LS
8,186,100 B2 * 5/2012 Chuang ................. A01G 9/243
47/17

(Continued)

FOREIGN PATENT DOCUMENTS

JP 2011-160789 A 8/2011
JP 2011-250774 A 12/2011
(Continued)

OTHER PUBLICATIONS

International Search Report dated May 26, 2015, issued in counterpart application No. PCT/JP2015/055320 (2 pages).

*Primary Examiner* — Kristen C Hayes
(74) *Attorney, Agent, or Firm* — Westerman, Hattori, Daniels & Adrian, LLP

(57) ABSTRACT

To provide a high-shelf hydroponic cultivation system equipped with a solar panel whereby an area under the solar panel can be effectively utilized and plants can be stably grown. In the high-shelf hydroponic cultivation system equipped with a solar panel according to the present invention, a cultivation tank is placed under the solar panel and plants P1 and P2 are hydroponically cultivated. Thus, an area under the solar panel 10 can be effectively utilized. Moreover, since the plants P1 and P2 are hydroponically cultivated in the high-shelf hydroponic cultivation system equipped with the solar panel, the plants P1 and P2 with high quality can be efficiently and stably cultivated. Furthermore, since the cultivation tank is placed at a specific height from the ground surface, a burden on an operator can be reduced, and the productivity of the plants P1 and P2 can be increased.

7 Claims, 2 Drawing Sheets

(51) Int. Cl.
H02S 20/23 (2014.01)
A01G 9/24 (2006.01)

(56) References Cited

U.S. PATENT DOCUMENTS

| 2010/0236164 | A1* | 9/2010 | Chuang | A01G 9/243 |
| | | | | 52/173.3 |
| 2011/0005128 | A1* | 1/2011 | Chuang | A01G 9/243 |
| | | | | 47/17 |
| 2012/0174478 | A1 | 7/2012 | Chen et al. | |
| 2016/0081282 | A1* | 3/2016 | Salomon | E04B 7/12 |
| | | | | 136/248 |

FOREIGN PATENT DOCUMENTS

| JP | 3172072 U | 12/2011 |
| JP | 2013-535959 A | 9/2013 |
| JP | 2014-18082 A | 2/2014 |
| WO | 2012/043381 A1 | 4/2012 |

* cited by examiner

HIGH-SHELF HYDROPONIC CULTIVATION SYSTEM EQUIPPED WITH SOLAR PANEL

TECHNICAL FIELD

The present invention relates to a high-shelf hydroponic cultivation system equipped with a solar panel, wherein a plant is hydroponically cultivated under the solar panel.

BACKGROUND ART

In recent years, a growing interest in renewable energy has led to the widespread use of solar panels, which receives sunlight and generates electric power, to ordinary homes and ordinary businesses. Mega solar power plants wherein solar panels are disposed in a relatively large space are also built in many places. However, when a solar panel is placed on the ground, in many cases, the area under the solar panel is not utilized. Taking such a problem into consideration, an invention described in the following [Patent Literature 1] discloses a technique wherein an agricultural plant is cultivated on the ground under a solar panel.

CITATION LIST

Patent Literature

[Patent Literature 1] Japanese Published Unexamined Patent Application No. 2014-018082

SUMMARY OF INVENTION

Technical Problem

However, there is a problem that the growing conditions of a plant depend on the weather, underground bacteria or the like in an open-field soil cultivation, and therefore fluctuation arises in the yield, quality or the like. There is another problem that an operator who performs agricultural work hurts his/her lower back in agricultural work on a low ground surface, and the productivity is low.

The present invention has been made in view of such a situation, and an object thereof is to provide a high-shelf hydroponic cultivation system equipped with a solar panel whereby an area under the solar panel can be effectively utilized and plants can be stably grown under the solar panel. Another object is to provide a high-shelf hydroponic cultivation system equipped with a solar panel whereby a burden on an operator in agricultural work can be reduced and a satisfactory working environment can be realized.

Solution to Problem (1) The present invention solves the above problems by providing a high-shelf hydroponic cultivation system 80 equipped with a solar panel, characterized by comprising: a solar panel 10, which generates electric power when receiving light; a frame unit configured to support the solar panel 10 at a specific angle; and a cultivation tank 30, which is placed under the solar panel 10 at a specific height from the ground surface and is used for hydroponically cultivating a specific plant.

(2) The present invention solves the above problems by providing the high-shelf hydroponic cultivation system 80 equipped with a solar panel described in (1) above, characterized in that the frame unit has: a transverse frame 20a configured to hold the solar panel at a specific angle; and a vertical frame 20b configured to support the transverse frame 20a, and the transverse frame 20a includes a mist device 26 configured to spray water to a plant.

(3) The present invention solves the above problems by providing the high-shelf hydroponic cultivation system 80 equipped with a solar panel described in (1) or (2) above, characterized in that the cultivation tank 30 is divided into a plurality of cultivation tanks and plants to be cultivated are varied depending on the received light quantities at the respective cultivation tanks 30.

(4) The present invention solves the above problems by providing the high-shelf hydroponic cultivation system 80 equipped with a solar panel described in any one of (1) to (3) above, characterized by comprising a cover unit 24 which makes a side face of the frame unit openable and closeable.

(5) The present invention solves the above problems by providing the high-shelf hydroponic cultivation system 80 equipped with a solar panel described in any one of (1) to (4) above, characterized in that an auxiliary lamp 22 is provided over a cultivation tank 30 having a small received light quantity.

Advantageous Effect of Invention

A high-shelf hydroponic cultivation system equipped with a solar panel according to the present invention hydroponically cultivates plants under the solar panel. Thus, an area under the solar panel can be effectively utilized. Moreover, it is possible to manage the cultivation environment of plants by suitably opening or closing a side face of the high-shelf hydroponic cultivation system equipped with a solar panel according to the present invention. Thus, plants with high quality can be efficiently and stably cultivated. Moreover, a farmer can obtain income from sales of the plants and income from sales of electric power.

Furthermore, since the cultivation tank is placed at a specific height from the ground surface, a burden on an operator can be reduced. Moreover, the solar panel at a top face and a cover unit configured to suitably close a side face can form a comfortable working environment for the operator. Thus, the productivity of the plants can be increased.

DESCRIPTION OF EMBODIMENT

Figure 1:
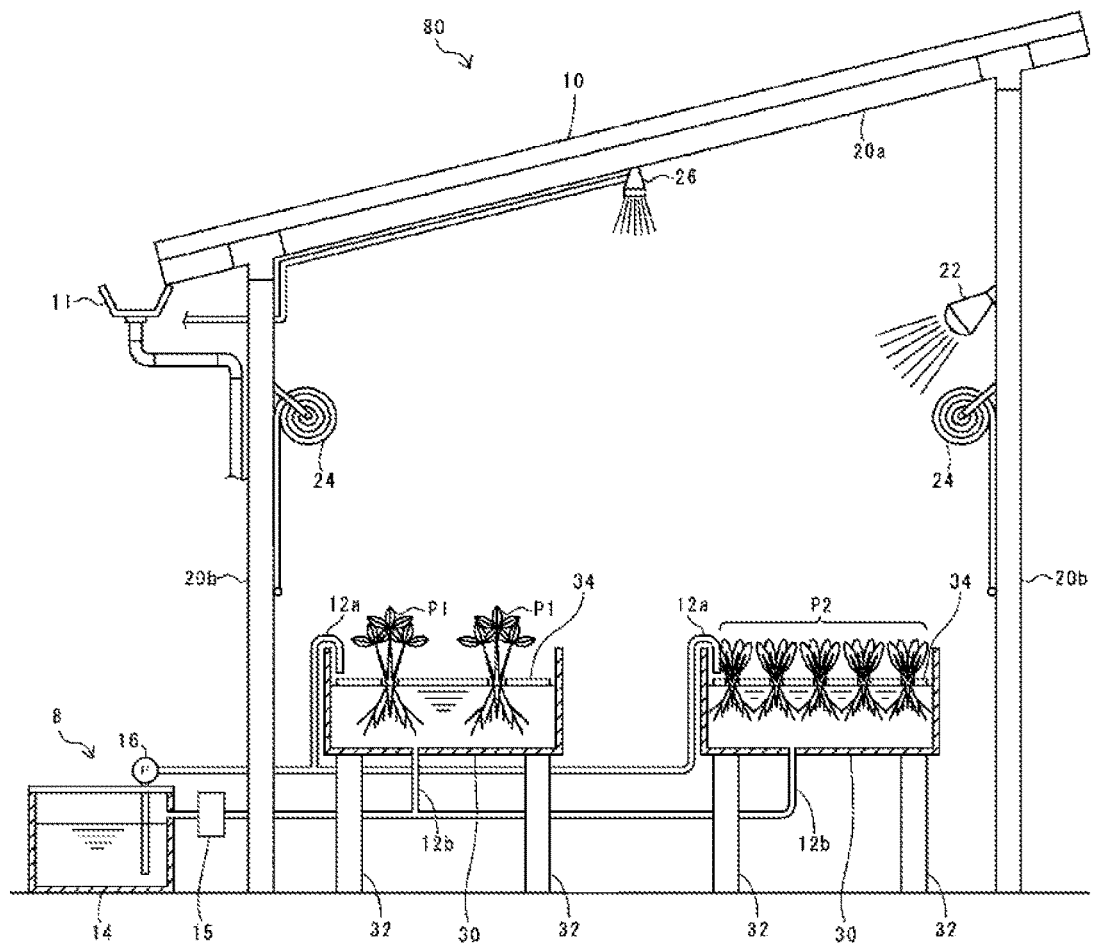
FIG. 1 A view for illustrating a high-shelf hydroponic cultivation system equipped with a solar panel according to the present invention.

An embodiment of a high-shelf hydroponic cultivation system 80 equipped with a solar panel according to the present invention will be described hereinafter based on the drawings. A high-shelf hydroponic cultivation system 80 equipped with a solar panel according to the present invention is provided with: a well-known solar panel 10, which generates electric power when receiving light; a transverse frame 20a configured to hold the solar panel 10 at a specific angle; a vertical frame 20b configured to support the transverse frame 20a; and a cultivation tank 30, which is placed under the solar panel 10, that is, in a frame unit composed of the transverse frame 20a and the vertical frame 20b.

The transverse frame 20a configured to hold the solar panel 10 is generally faced south and is fixed at an angle whereby the solar panel 10 is irradiated most efficiently with sunlight. It is to be noted that a roof or the like is provided over the transverse frame 20*a*, so as to prevent infiltration of rainwater or the like from a gap of the solar panel 10 into the frame unit. Moreover, a rain gutter 11 is preferably placed at the transverse frame 20*a*, so as to guide rainwater or the like flowing on the solar panel 10 (and the roof) toward a specific catch drain or the like. With such a structure, rainwater flowing on the solar panel 10 does not drip onto the ground, and therefore mud splattering or the like caused by such dripping can be prevented.

Moreover, the cultivation tank 30 is supplied with nutrient solution suitable for plant cultivation, so that plants P1 and P2 are hydroponically cultivated in the cultivation tank 30. It is to be noted that the cultivation tank 30 is provided with a leg unit 32, so that the cultivation tank 30 is placed at a specific height. The height of the cultivation tank 30 is preferably set so that the liquid level of the nutrient solution is at approximately 70 cm to 85 cm from the ground. Since the cultivation tank 30 is placed at such a height, the operator can perform agricultural work without bending down, and therefore a burden in agricultural work can be reduced and the productivity of the agricultural plant can be increased.

Supply of the nutrient solution to the cultivation tank 30 is preferably achieved by a circulation type nutrient solution supply device 8 illustrated in FIG. 1, for example. The circulation type nutrient solution supply device 8 is provided with: a nutrient solution tank 14 configured to store nutrient solution; a nutrient solution supply pipe 12*a* configured to supply nutrient solution in the nutrient solution tank 14 to the cultivation tank 30; a solution feeding pump 16 configured to feed the nutrient solution stored in the nutrient solution tank 14 via the nutrient solution supply pipe 12*a* to the cultivation tank 30; a drain pipe 12*b* configured to return the nutrient solution, which has been supplied to the cultivation tank 30, to the nutrient solution tank 14; and a filter 15 configured to filter nutrient solution returning to the nutrient solution tank 14. The nutrient solution tank 14 stores nutrient solution containing a specific concentration of a specific fertilizer component, and operation of the solution feeding pump 16 supplies nutrient solution to the cultivation tank 30 and returns nutrient solution through the drain pipe 12*b* to the nutrient solution tank 14. It is preferable that the nutrient solution tank 14 collectively stores nutrient solution of an amount corresponding to a cultivating period of the plants P1 and P2 to be cultivated in the cultivation tank 30, so that the nutrient solution is circulated for a specific cultivating period (approximately one month). With such a structure, returned nutrient solution can be reused, and therefore fertilizer or water can be saved, costs can be reduced, and an environmental burden can be reduced.

Moreover, a well-known method which has been conventionally used can be employed as a method for holding the plants P1 and P2 in the cultivation tank 30. For example, a lid provided with cultivation holes configured to hold plants or a floating bench 34 made of foamed polystyrene may be placed in the cultivation tank 30 so as to hold the plants P1 and P2, or cultivation media such as rock wool, coconut shells or urethane may be used to hold the plants P1 and P2. When a floating bench 34 made of foamed polystyrene is used, it is to be noted that it is particularly preferable in terms of work efficiency that the cultivation holes configured to hold the plants P1 and P2 are formed in two rows or five rows.

Figure 2:
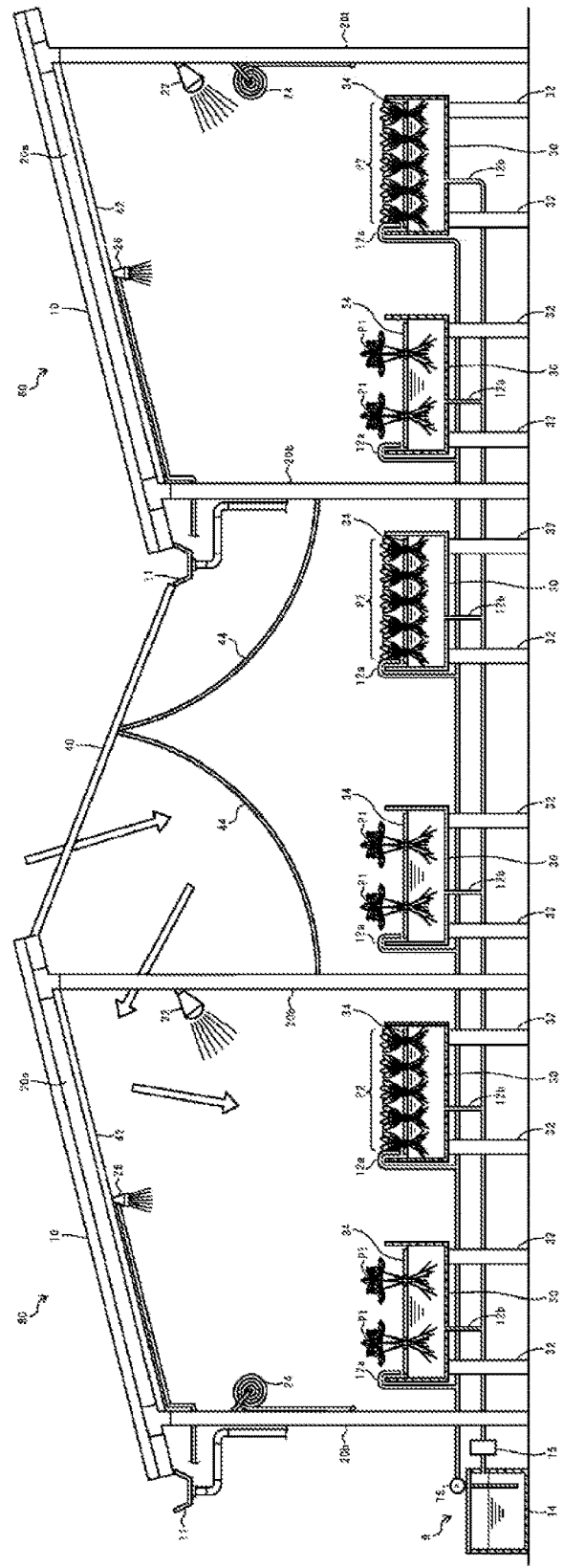
FIG. 2 A view for illustrating a high-shelf hydroponic cultivation system equipped with a solar panel according to the present invention.

As the plants P1 and P2, it is preferable to select a plant, which can be grown by relatively weak light having a solar radiation quantity equal to or smaller than 25% of a natural state, such as *Cryptotaenia japonica, Zingiber mioga, Petasites japonica, Perilla frutescens* or *Oenanthe*. It is to be noted that the light quantity may be measured at various positions in the cultivation tank 30, the cultivation tank 30 may be divided into a plurality of sections depending on the received light quantity, and plants to be cultivated may be varied depending on the received light quantities at the sections. For example, in a section having a relatively small received light quantity, a plant which can be grown by even weaker light is selected from plants that can be grown by relatively weak light and is cultivated. In a section having a relatively large received light quantity, a plant which relatively prefers sunshine is selected from plants that can be grown by relatively weak light and is cultivated. With such a structure, an appropriate plant is selected and cultivated depending on the received light quantity of the cultivation tank 30, and therefore efficient plant cultivation can be achieved. In a section having an insufficient received light quantity, it is to be noted that an auxiliary lamp 22 may be placed over the cultivation tank 30 of the section, so that the auxiliary lamp 22 compensates for shortage of light quantity. It is to be noted that a well-known lighting lamp such as an LED lamp or a fluorescent lamp can be used as the auxiliary lamp 22. Moreover, as illustrated in FIG. 2, a light transmissive roof member 40 such as a fluorine film may be provided at a roof part between ridges of the high-shelf hydroponic cultivation system 80 equipped with a solar panel, a reflection sheet 44 having light reflectivity may be placed, and a reflection plate 42 may be placed at the transverse frame 20*a* of the high-shelf hydroponic cultivation system 80 equipped with a solar panel, so as to guide sunlight, which shines into a space between ridges, into the frame unit as represented by the void arrow in FIG. 2. Moreover, a cultivation tank 30 may be additionally provided in the area. It is to be noted that the vertical frame 20*b* in FIGS. 1 and 2 is preferably coated with whitish paint having light reflectivity. With such a structure, sunlight which shines into a space between ridges can be guided into the frame unit so that the light quantity in the frame unit is increased, infiltration of rainwater into the frame unit can be further prevented, the growth environment and the working environment in the frame unit can be improved, and the yield of the plants P1 and P2 can be enhanced by increase in the cultivating area.

Moreover, a cover unit 24 which has light transmissivity and can be freely opened and closed is placed at all side faces of the frame unit. A windable and transparent sheet made of synthetic resin is preferably used as the cover unit 24. However, the cover unit 24 is not limited to such a sheet, and a glass plate, a door or the like which can be opened and closed may be used. By suitably opening or closing the cover unit 24 depending on the weather, the temperature or the like, a side face of the frame unit is put into an opened state, a closed state or a half-opened state. Thus, infiltration of rainwater into the frame unit can be prevented by closing the cover unit 24 in rainy weather, for example. Moreover, damage by strong winds can be prevented. Moreover, the temperature in the frame unit can be adjusted by putting the cover unit 24 into an opened state, a closed state or a half-opened state depending on the outdoor temperature. Thus, the growth environment of the plants P1 and P2 in the frame unit can be managed to a certain extent. Moreover, the working environment of the operator can be improved by blocking off rain or direct sunlight together with the solar panel 10.

Furthermore, a mist device 26 configured to atomize and spray water may be provided at the transverse frame 20a. It is to be noted that a water supply pipe to the mist device 26 may be placed along the transverse frame 20a, or may be placed through the transverse frame 20a. With such a structure, the temperature in the frame unit can be lowered by evaporation of mist. Moreover, the humidity in the frame unit can be raised. Thus, the growth environment of the plants P1 and P2 in the frame unit can be further managed, and the working environment of the operator can be improved.

As described above, regarding the high-shelf hydroponic cultivation system 80 equipped with a solar panel according to the present invention, the cultivation tank 30 is placed under the solar panel 10 and the plants P1 and P2 are hydroponically cultivated. Thus, an area under the solar panel 10 can be effectively utilized. In the high-shelf hydroponic cultivation system 80 equipped with a solar panel according to the present invention, the plants P1 and P2 are hydroponically cultivated, labor for fertilizing or watering can be saved, and the fertilizer amount can be easily managed. Moreover, disease damage by underground bacteria, replant failure or the like can be prevented. Thus, plants P1 and P2 with high quality can be efficiently and stably cultivated. Furthermore, since the cultivation tank 30 is placed at a specific height from the ground surface, a burden on an operator can be reduced and the productivity of the plants P1 and P2 can be increased.

Moreover, regarding the high-shelf hydroponic cultivation system 80 equipped with a solar panel according to the present invention, the solar panel 10 blocks off rain or direct sunlight, and a cover unit 24 which can be opened and closed is provided at aside face of the frame unit. Inflow of rainwater or damage by wind and snow can be prevented by closing the side face of the frame unit using the cover unit 24. Moreover, the temperature and the humidity in the frame unit can be adjusted to a certain extent by suitably opening or closing the cover unit 24. Thus, the environment in the frame unit can be managed, and plants P1 and P2 with high quality can be further efficiently and stably cultivated. Moreover, a satisfactory working environment for an operator can be formed.

In addition, the farmer can obtain income from sales of electric power generated by the solar panel 10 or the like in addition to income from sales of the plants P1 and P2 cultivated in the cultivation tank 30. Thus, the income of the farmer can be increased.

It is to be noted that the shapes, structures and dimensions of the respective parts of the high-shelf hydroponic cultivation system 80 equipped with a solar panel, the cultivated plants and the like illustrated in this example are only exemplary, and the present invention can be modified and implemented without departing from the gist of the invention.

REFERENCE SIGNS LIST

10 solar panel
30 cultivation tank
80 high-shelf hydroponic cultivation system equipped with solar panel
20a transverse frame
20b vertical frame
22 auxiliary lamp
24 cover unit
26 mist device
8 circulation type nutrient solution supply device

The invention claimed is:

1. A shelf hydroponic cultivation system equipped with a solar panel, comprising:
    a solar panel, which generates electric power when receiving light;
    a plurality of frame units configured to support the solar panel, the plurality of frame units comprising a transverse frame configured to hold the solar panel and a vertical frame configured to support the transverse frame, the traverse frame being faced south of the solar panel; and
    a cultivation tank, which is placed under the solar panel at a specific height from a ground surface and is used for hydroponically cultivating a plant,
    wherein a light transmissive roof member is provided between ridges of the plurality of frame units, a reflection sheet having light reflectivity is placed under the roof member so as to guide light, which shines into a space between ridges, into the plurality of frame units, and the cultivation tank is also provided between the ridges, and
    wherein the specific height is a height where a liquid level of a nutrient solution supplied to the cultivation tank is at 70 cm to 85 cm from the ground surface.

2. The shelf hydroponic cultivation system equipped with a solar panel according to claim 1, wherein
    a reflection plate is placed at the transverse frame so as to guide light, which is reflected at the reflection sheet, to the cultivation tank side.

3. The shelf hydroponic cultivation system equipped with a solar panel according to claim 2, further comprising a windable cover unit which opens and closes a side face of the plurality of frame units.

4. The shelf hydroponic cultivation system equipped with a solar panel according to claim 2, wherein a rain gutter is provided at the transverse frame.

5. The shelf hydroponic cultivation system equipped with a solar panel according to claim 1, further comprising a windable cover unit which opens and closes a side face of the plurality of frame units.

6. The shelf hydroponic cultivation system equipped with a solar panel according to claim 5, wherein a rain gutter is provided at the transverse frame.

7. The shelf hydroponic cultivation system equipped with a solar panel according to claim 1, wherein a rain gutter is provided at the transverse frame.

* * * * *